(12) United States Patent
Puppin et al.

(10) Patent No.: US 9,460,275 B1
(45) Date of Patent: Oct. 4, 2016

(54) FINGERPRINTING CONTENT VIA A PLAYLIST

(71) Applicant: Google Inc., Mountain View, CA (US)

(72) Inventors: Diego Puppin, Newton, MA (US); Mehul Agarwal, Boston, MA (US)

(73) Assignee: Google Inc., Mountain View, CA (US)

( * ) Notice: Subject to any disclaimer, the term of this patent is extended or adjusted under 35 U.S.C. 154(b) by 173 days.

(21) Appl. No.: 14/144,038

(22) Filed: Dec. 30, 2013

(51) Int. Cl.
*H04L 29/06* (2006.01)
*G06F 21/16* (2013.01)

(52) U.S. Cl.
CPC .................. *G06F 21/16* (2013.01)

(58) Field of Classification Search
CPC .............. H04N 21/23439; H04N 21/8359; H04N 21/8456; H04N 21/258; H04N 21/26; H04N 21/8358; H04N 21/42684; H04N 7/1675; G06F 21/10; G06F 21/60
USPC .............. 380/31, 42, 252, 287, 54; 382/100; 726/30; 713/176
See application file for complete search history.

(56) References Cited

U.S. PATENT DOCUMENTS

| | | | | |
|---|---|---|---|---|
| 2006/0239503 A1* | 10/2006 | Petrovic | ......... | H04L 9/002 382/100 |
| 2008/0025554 A1* | 1/2008 | Landwehr | ......... | H04N 1/32144 382/100 |
| 2012/0069218 A1* | 3/2012 | Gantman | ......... | H04N 7/147 348/231.99 |
| 2012/0308071 A1* | 12/2012 | Ramsdell | ......... | H04N 1/32144 382/100 |
| 2014/0023225 A1* | 1/2014 | Chalamala | ......... | G06T 1/0021 382/100 |
| 2014/0032918 A1* | 1/2014 | Wendling | ......... | H04N 21/23892 713/176 |
| 2014/0086408 A1* | 3/2014 | Bickmore | ......... | H04N 21/42684 380/210 |
| 2014/0086445 A1* | 3/2014 | Brubeck | ......... | H04N 21/23439 382/100 |
| 2015/0180873 A1* | 6/2015 | Mooij | ......... | H04N 21/2585 726/4 |

* cited by examiner

*Primary Examiner* — Izunna Okeke
*Assistant Examiner* — Hee Song
(74) *Attorney, Agent, or Firm* — Fenwick & West LLP (57) ABSTRACT

A system and method for fingerprinting content via a playlist are provided. The system includes a content requestor to receive an indication that a request for content is to be served, the content being served with a duplication restriction; a code generator to generate a code with a plurality of bits associated with the content being served, a number of the plurality of bits of the code being defined based on the length of the content divided by a predetermined length of equally sized segments; a playlist generator to generate a playlist to serve a plurality of segments, each of the plurality of segment's length being determined by a corresponding bit of the code; and a playlist transmitter to transmit the playlist along with the content to a visitor or device associated with the request.

19 Claims, 5 Drawing Sheets

FINGERPRINTING CONTENT VIA A PLAYLIST

BACKGROUND

Content sharing services serve content, such as pictures, videos, text, or combinations thereof, to visitors who access the content sharing service. The content may be sourced from a publisher, automatically generated, or uploaded by one of the visitors to the content sharing service. The content may be represented as digitally encoded information. The content sharing service may store the content, or link to other services and subsequently retrieve the content prior to serving the content to the visitors.

The visitor may employ various techniques to access the content. For example, the visitor may access the content sharing service through a browser. In another example, the visitor may access the content sharing service via an application installed on a mobile device. The visitor may use any sort of device enabled to interact with the content sharing service, such as a personal computer, mobile phone, or an Internet enabled television, for example.

In certain instances, the content sharing service may serve content to be downloaded via the visitor's device, which may subsequently be stored and consumed by the visitor. In those cases, the content sharing service may intend that the visitor be the sole consumer of the content. In these cases, the content sharing service may be incentivized to ensure that the visitor does not make any unauthorized duplicates of the content, which may be subsequently copied and redistributed.

Various techniques may be employed to ensure that the visitor does not duplicate the content. The content may be distributed with a digital signature, with the digital signature ensuring that the content is only served via the visitor's device. In this case, the visitor may still find a way to re-record the content when it is being served (i.e. via a third-party application that records the raw data of the content presentation). Thus, efforts to protect the content via this technique may be frustrated.

In another case, the visitor may be dis-incentivized to re-distribute content by hiding a record associated with the visitor in the content through watermarking. In certain cases, the content may be re-encoded, and a watermark may be added to the content identifying the visitor. A watermark is a hidden digital object not visible via video or audio that indicates information about the content. Thus, if a visitor is served content, and subsequently redistributes the content, the redistributed content will indicate which visitor the content was initially distributed to. However, in implementing this technique, a large amount of processing power and time may be required re-encode every content item per visitor.

SUMMARY

A system and method for fingerprinting content via a playlist are provided. The system includes a content requestor to receive an indication that a request for content is to be served, the content being served with a duplication restriction; a code generator to generate a code with a plurality of bits associated with the content being served, a number of the plurality of bits of the code being defined based on the length of the content divided by a predetermined length of equally sized segments; a playlist generator to generate a playlist to serve a plurality of segments, each of the plurality of segment's length being determined by a corresponding bit of the code; and a playlist transmitter to transmit the playlist along with the content to a visitor or device associated with the request.

DESCRIPTION OF THE DRAWINGS

The detailed description refers to the following drawings, in which like numerals refer to like items, and in which.

DETAILED DESCRIPTION

A content sharing service serves content to various visitors. The content may be video, audio, text, or a combination thereof. The visitor may be presented an option to download the content, and locally play the content. In these cases, a playlist may be transmitted to the visitor that indexes the content. A playlist may also be employed in cases where the visitor streams the content. For example, the content may be 2 hours in length, and distributed in 5 second segments. Thus, the playlist would include 1,440 segments. By providing content via a playlist, the visitor can download certain segments, and subsequently view the segments, while downloading the non-active segments simultaneously.

In certain cases, the content sharing service may restrict the re-distribution of the content. The content sharing service may enter into an agreement with the content receiving party (i.e. to the visitor) restricting the duplication and re-serving of the content. Thus, the visitor may not be allowed to make copies of the content, and upload or share the content to other third parties. In this way, the content sharing service may ensure that the parties who pay for the content are the only parties who receive the content. In another example, the content sharing service may distribute the content to a limited number of parties, for example, in the case of a preview to an upcoming movie, and thus desire that duplicates are not transmitted to a larger audience than originally intended.

The content sharing service may encode the content in certain ways to ensure the content is not capable of being duplicated ("copy protection"). However, the visitor receiving the content may employ third-party applications to break the copy-protection. For example, the encrypted content may need to be unencrypted to be served on the visitor's computer. During the process of unencrypting the content, the content may be captured and distributed to unauthorized third parties.

Disclosed herein are methods and systems for fingerprinting digital content via a playlist. By employing the techniques disclosed herein, a content sharing service may distribute content with a unique fingerprint. Thus, in cases where duplicated copies of the content are discovered, the content sharing service may effectively ascertain the source of the duplication by identifying the unique fingerprint.

Further, because the technique disclosed herein does not require re-encoding, the implementer of the systems and methods disclosed herein may provide unique fingerprinting in an efficient and time saving manner.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Figure 1:
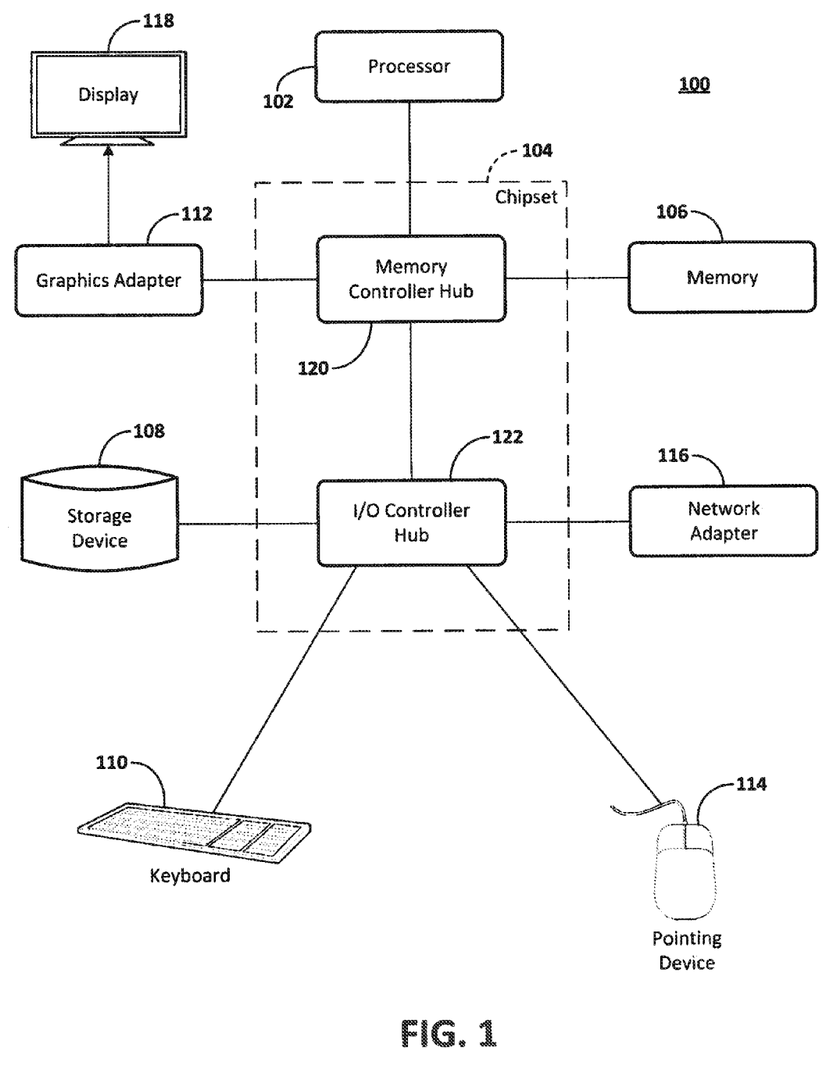
FIG. 1 is a block diagram illustrating an example computer.

FIG. 1 is a block diagram illustrating an example computer 100. The computer 100 includes at least one processor 102 coupled to a chipset 104. The chipset 104 includes a memory controller hub 120 and an input/output (I/O) controller hub 122. A memory 106 and a graphics adapter 112 are coupled to the memory controller hub 120, and a display 118 is coupled to the graphics adapter 112. A storage device 108, keyboard 110, pointing device 114, and network adapter 116 are coupled to the I/O controller hub 122. Other embodiments of the computer 100 may have different architectures.

The storage device 108 is a non-transitory computer-readable storage medium such as a hard drive, compact disk read-only memory (CD-ROM), DVD, or a solid-state memory device. The memory 106 holds instructions and data used by the processor 102. The pointing device 114 is a mouse, track ball, or other type of pointing device, and is used in combination with the keyboard 110 to input data into the computer 100. The pointing device 114 may also be a gaming system controller, or any type of device used to control the gaming system. For example, the pointing device 114 may be connected to a video or image capturing device that employs biometric scanning to detect a specific user. The specific user may employ motion or gestures to command the point device 114 to control various aspects of the computer 100.

The graphics adapter 112 displays images and other information on the display 118. The network adapter 116 couples the computer system 100 to one or more computer networks.

The computer 100 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 108, loaded into the memory 106, and executed by the processor 102.

The types of computers used by the entities and processes disclosed herein can vary depending upon the embodiment and the processing power required by the entity. The computer 100 may be a mobile device, tablet, smartphone or any sort of computing element with the above-listed elements. For example, a data storage device, such as a hard disk, solid state memory or storage device, might be stored in a distributed database system comprising multiple blade servers working together to provide the functionality described herein. The computers can lack some of the components described above, such as keyboards 110, graphics adapters 112, and displays 118.

The computer 100 may act as a server (not shown) for the content sharing service disclosed herein. The computer 100 may be clustered with other computer 100 devices to create the server. The various computer 100 devices that constitute the server may communicate with each other over a network 250.

Figure 2:
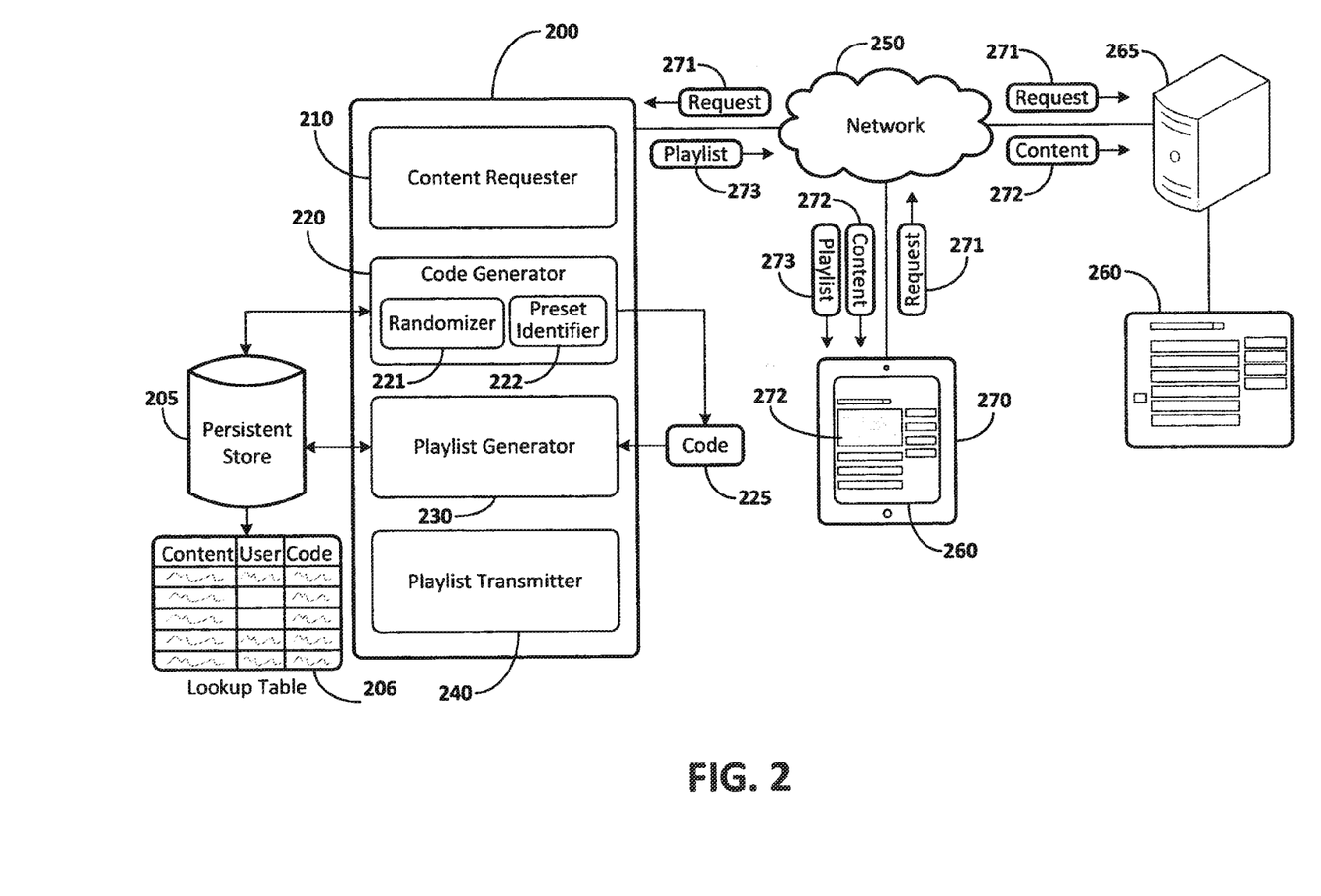
FIG. 2 illustrates an example of a system for fingerprinting content via a playlist.

FIG. 2 illustrates an example of system for fingerprinting content via a playlist. The system 200 includes a content requestor 210, a code generator 220, a playlist generator 230, and a playlist transmitter 240. The system 200 may be implemented along with a content sharing service 260. As shown in FIG. 2, the system 200 communicates via network 250; however, in another example, the system 200 may be integrated into a server 265 that hosts the content sharing service 260. The server 265 and system 200 may be implemented on a device, such as computer 100.

A device 270 is also shown. The device 270 is served content 272 via the content sharing service 260. As shown, the device 270 is a mobile device, such as a smart phone or a tablet. However, a visitor to content sharing service 260 may employ any device, such as those enumerated above in regards to computer 100.

The content requestor 210 receives an indication that a request 271 from the device 270 for a specific content item 272 is made. Alternatively, the content sharing service 260 may employ a selection algorithm to deliver the specific content item 272 to the device 270. In either case, the content requestor 210 detects that the specific content item 272 is to be served to an operator of device 270.

The code generator 220 determines a code 225 to generate based on the content item 272 to be served to the device 260. The length of the content item 272 is divided by the time associated with each segment of the playlist. The length of each segment may be predefined by the implementer of the system 200. For example, if the content item is 2 hours in length, and each segment is 5 seconds in length, the code generated may be 1,440 bits in length (2 hours divided by 5 seconds).

The code generator 220 may include a randomizer 221, or a preset identifier 222. The randomizer 221 generates a random code 225 associated with the content item 272. The random code 225 matches the length of the generated code length as calculated by the code generator 220. The random code 225 may include a first portion identifying the specific content item 272 and a second portion identifying the visitor or device 270 being served the content item.

In another example, the code generator 220 may employ a preset identifier 222 to generate the code 225. The preset identifier 222 may be any sort of uniquely identifying information about the visitor or device being served the content item 272. For example, the preset identifier may be a previously stored code, a user name, an email address, or the like.

In certain cases, the code 225 may be less than the length calculated by the code generator 220. As explained below, certain bits may be set as a <null> value, and thus, the code 225 may be interspersed within the bit stream of a resultant playlist.

The playlist generator 230 generates a playlist based on code 225 (via the code generator 220). Each segment of the playlist's starting time is set based on code 225. For example, if code 225 has the following value: 0, <null>, 1. Accordingly, the playlist generator 230 may generate a playlist 273 based on the code 225 listed above. The following rules may be maintained in generating playlist starting times. A value of 0 may correspond to a longer segment, a value of <null> may correspond to a standard segment, and a value of 1 may correspond to a shorter segment.

Due to the fact that the <null> values are not assigned, if the segment is significantly long enough, a watermark that is added to the content may be encoded in the various <null> segments of code 225.

Further, if each segment is a predetermined length, such as 5 seconds, the longer and shorter gradients of each segment may be predefined based on an amount of time in which the viewer of content item 272 does not detect any visible changes. Thus, if the longer and shorter gradients are set to a significantly small time, for example 1 millisecond, the operator of device 270 will not notice that the content item 272 has been altered.

Thus, based on the example of code 225 discussed above, and given a 5 second segment time, with a gradient of 1 millisecond, the following playlist start times correspond to code 225:

Start time 1: 0 seconds
Start time 2: 5.001 seconds (segment 1 is 1 millisecond longer→1)
Start time 3: 10.001 seconds (segment 2 is 5 seconds→<null>)
Start time 4: 15.000 seconds (segment 3 is 1 millisecond shorter→0)

Based on the above example, a playlist 273 may be constructed corresponding to the content item 272 associated with the request 271. When the content item 272 is played back, the various time gradients introduced above may not be apparent to the visitor. However, because the segments overlap, contain a gap, or normally progress from one segment to another—the content item 272 contains noise reflecting this phenomena.

Accordingly, the system 200 may store the generated playlist 273 in the persistent store 205. The persistent store 205 is a storage device, such as those enumerated above in regards to storage device 108. The persistent store 205 may contain a lookup table 206. The lookup table 206, as shown in FIG. 2, contains a field for content, user, and code. The user field may be substituted with any sort of identifying information associated with the party receiving content item 272 (such as the device, email, or the like). The lookup table 206 stores a record of content that has been distributed, a record of the party that received the content, and the code employed to generate the playlist.

The playlist transmitter 240 transmits the playlist 273 to the receiving party. The playlist 273 is served in conjunction with the content 272. Accordingly, when the content 272 and the playlist 273 are received at device 270, and a command is initiated to play the content 272; an application on device 270 serves the content 272 employing playlist 273. In certain transitions from segments, there may be gaps in play; however, if the gradient chosen by an implementer of system 200 is below a certain threshold, the viewer of content 272 will not notice the gaps in time. The gaps in play, or overlap in play create noise that is not detectable by a viewer of content 272.

However, if the content item 272 is duplicated, the noise caused by the gradients also gets duplicated. In these cases, a party analyzing the duplicated copy of content item 272 may recompile the code 225 based on the observed noise. The recompilation may be accomplished because overlaps in play and gaps in play correspond to specific values employed to created code 225.

Figure 3:
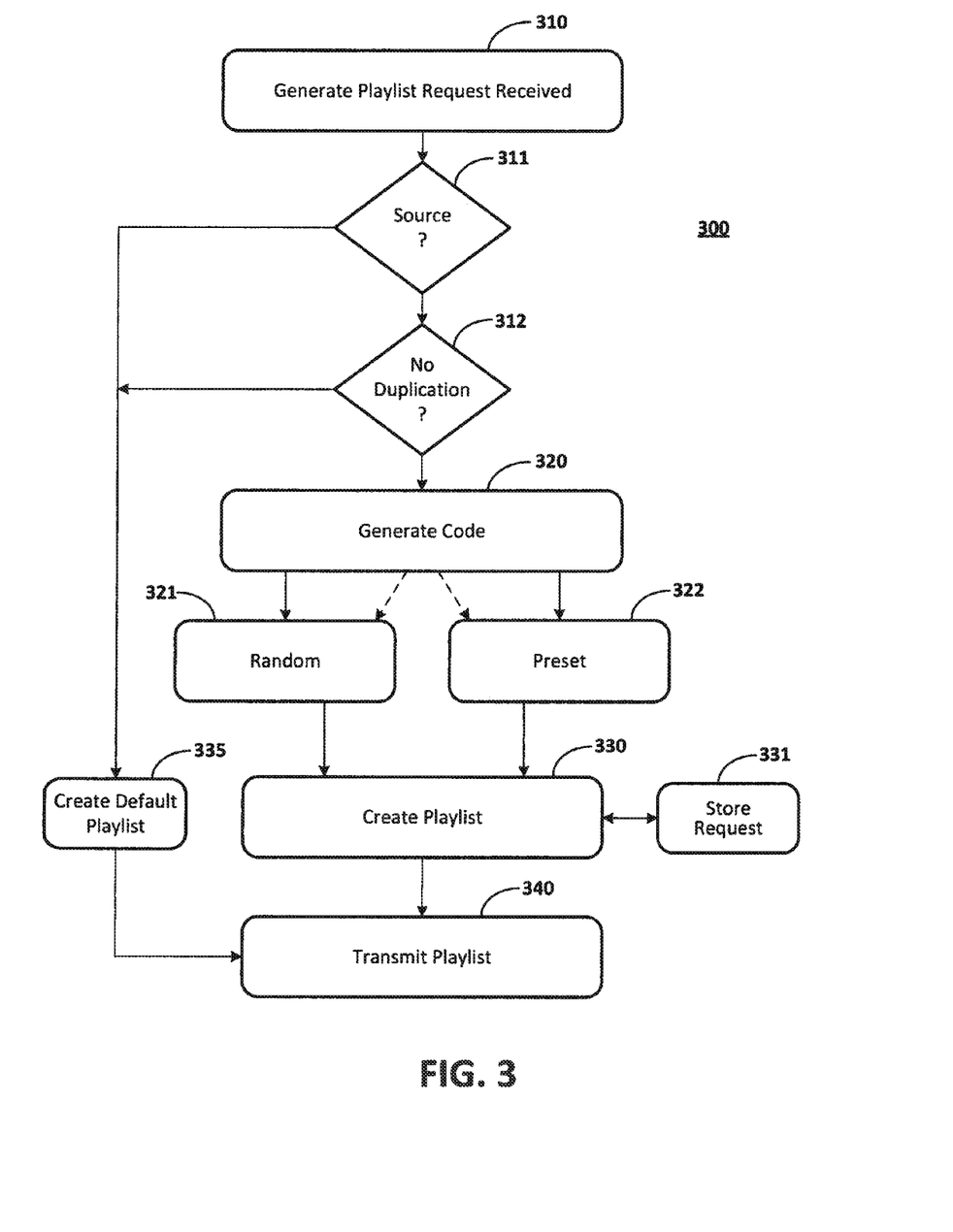
FIG. 3 illustrates an example of a method for fingerprinting content via a playlist.

FIG. 3 illustrates an example of a method 300 for fingerprinting via a playlist.

In operation 310, a request to generate a playlist is received. The request may be generated in response to content being requested from a content sharing service 260. The request may include the source of the request 311 (i.e. the visitor or device making the request), and if the request is associated with duplication restrictions 312. If the content has no duplication restrictions, the method 300 proceeds to operation 335, where a default playlist is created. The segments of the playlist may correspond to a predetermined length set by the content distributor.

In operation 320, a code associated with the request is generated if the content is associated with duplication restrictions. The code may be generated similarly to the operation performed by the code generator 220. The code may be assigned randomly 321, or assigned via a preset code associated with either the content associated with the request, the visitor, or the device. In another example, certain portions of the code may be random, while other portions of the code may be associated with a known aspect (such as the content associated with the request, the visitor, or the device).

In operation 330, the code generated in operation 320 is employed to create a playlist similarly to the operation performed by the playlist generator 220. As explained above, the playlist generated contains minor gradients in length for each segment, with each gradient corresponding to the code generated in operation 320. For example, if the code generated is a bit stream, each segment of the playlist may correspond to each bit of the bit stream. In operation 331, a record of the code, the content associated with the playlist, and the party receiving the playlist and the content is recorded in a lookup table, such as lookup table 206.

In operation 340, the playlist is transmitted to the content distributor. Accordingly, the content distributor may send the playlist along with the content. In response to viewing the content, the receiving party may have no knowledge that each segment of the playlist contains time gradients. However, if the content is duplicated, the time gradients are also duplicated and captured. Thus, based on the noise introduced by the time gradients, a party analyzing the duplicated content item may be able to recompile the code, and thus, identify the source of the content duplication.

Figure 4:
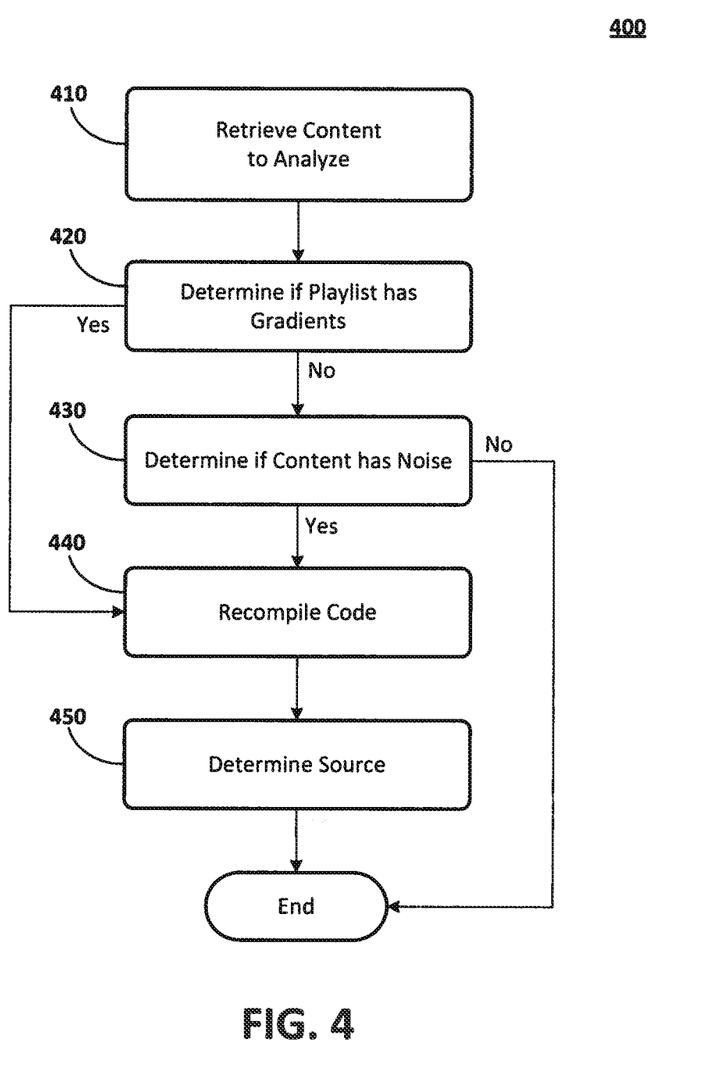
FIG. 4 illustrates an example of a method for detecting an unauthorized duplication based on the fingerprinting performed by method described in FIG. 3.

FIG. 4 illustrates an example of a method 400 for detecting an unauthorized duplication based on the fingerprinting performed by method 300.

In operation 410, content to be analyzed is retrieved. The content may be sourced from an online source, thereby indicating that the content may have been duplicated in an unauthorized fashion In operation 420, the content's playlist is analyzed to determine if the content has time gradients associated with the plurality of segments associated with the content. If the determination in operation 420 indicates that the playlist's segments includes gradients (i.e. extra or missing milliseconds), method 400 proceeds to operation 440. If not, the method 400 proceeds to operation 430.

In operation 430, the content is analyzed for noise associated with introduced gradients. The noise may be detected based on imperfections to the playlist introduced by the addition of gaps or overlaps. In certain cases, a duplicator of content may normalize all the playlist segments, thereby frustrating the attempts to determine if imperfect segments exist based on reviewing the playlist alone. However, in these cases, the duplicated content may still maintain the noises associated with the time gradients. Thus, in operation 430, a determination is made as to whether the duplicated content contains noise introduced by the various time gradients associated with a playlist creation. If the analysis performed in operation 430 detects no noise associated with time gradients, method 400 proceeds to end.

In operation 440, a code associated with the duplicated content is recompiled. The various time gradients, as ascertained by either the playback or the introduced noise, are recorded. Subsequently, using the rules employed to generate a code from the playlist, the code is determined.

In operation 450, the recompiled code is employed to determine a source of the duplicated content via a lookup table, such as lookup table 206. The recompiled code may be recorded by a playlist generating system, such as system 200. Thus, the implementer of method 400 may successfully determine the source of the duplicated content.

Figure 5A:
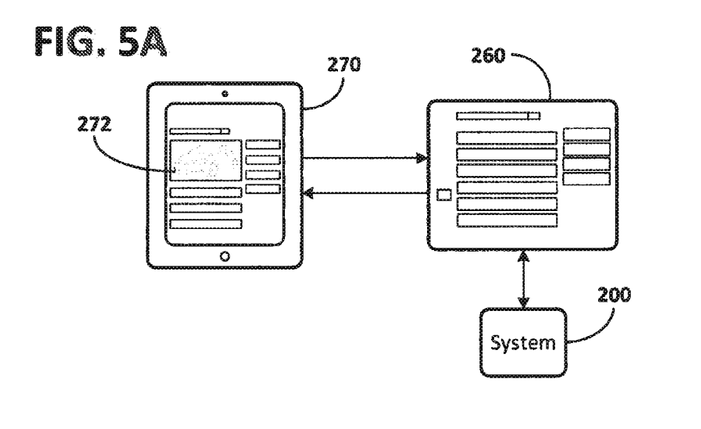
FIGS. 5A-5C illustrate an example of the system in FIG. 2 being employed by a content sharing service to ascertain whether unauthorized duplicates of a content item have been made and distributed, and to determine a source of the duplication.
Figure 5B:
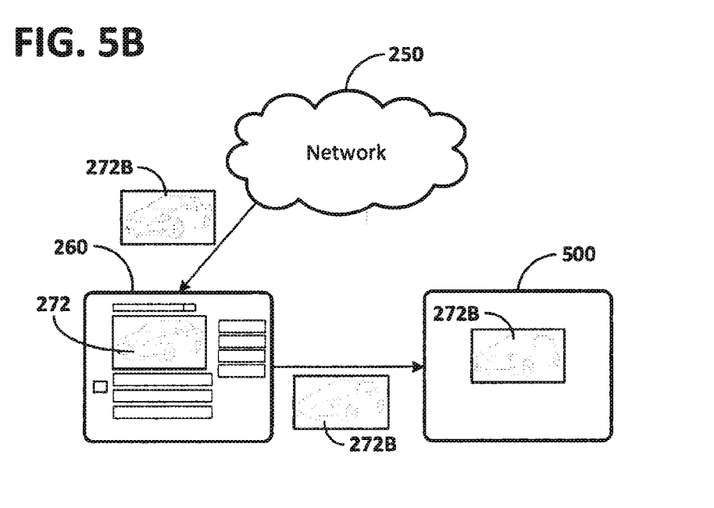
Figure 5C:
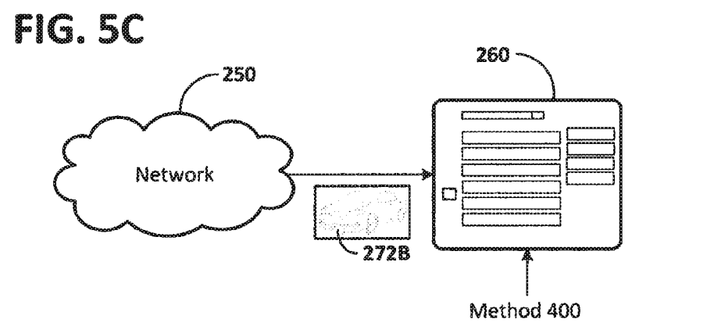

FIG. 5 illustrates an example of the system 200, method 300 and method 400 being employed by a content sharing service 260 to ascertain whether unauthorized duplicates of a content item 272 have been made and distributed, and to determine a source of the duplication.

Referring to FIG. 5(*a*), a content item 272 with a playlist 273 is transmitted to the device 270. As explained above in regards to FIGS. 2 and 3, the playlist 273 is generated according the aspects disclosed herein. Thus, the playlist 273 may be constructed based on a code 225 assigned to the visitor associated with device 270, or an identification associated with the visitor.

Referring to FIG. 5(*b*), the visitor associated with device 270 makes an unauthorized duplication of content item 272 (272*b*). The duplicated content item 272*b* may be transmitted and consumed on another device, such as device 500, or transmitted to a third-party sharing service via network 250.

Referring to FIG. 5(*c*), the content sharing service 260 monitors the network 250 for instances of alleged duplicated content items, such as content item 272*b*. For example, the content sharing service 260 may employ an automated algorithm for downloading content items originally sourced from the content sharing service 260. The content sharing service 260 may employ a technique, such as method 400, to determine that the duplicated content item 272*b* corresponds to, and was originally sourced from content item 272.

Certain of the devices shown in FIG. 1 include a computing system The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAMs) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols The preceding disclosure refers to a number of flow charts and accompanying descriptions to illustrate the embodiments represented in FIGS. 3 and 4. The disclosed devices, components, and systems contemplate using or implementing any suitable technique for performing the steps illustrated in these figures. Thus, FIGS. 3 and 4 are for illustration purposes only and the described or similar steps may be performed at any appropriate time, including concurrently, individually, or in combination. In addition, many of the steps in these flow charts may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on a tangible computer storage medium for execution by one or more processors. A computer storage medium can be, or can be included in, a computer-readable storage device, a computer-readable storage substrate, or a random or serial access memory. The computer storage medium can also be, or can be included in, one or more separate tangible components or media such as multiple CDs, disks, or other storage devices. The computer storage medium does not include a transitory signal.

As used herein, the term processor encompasses all kinds of apparatus, devices, and machines for processing data, including by way of example a programmable processor, a computer, a system on a chip, or multiple ones, or combinations, of the foregoing. The processor can include special purpose logic circuitry, e.g., an FPGA (field programmable gate array) or an ASIC (application-specific integrated circuit). The processor also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, module, engine, software, software application, script, or code) can be written in any form of programming language, including compiled or interpreted languages, declarative or procedural languages, and the program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

To provide for interaction with an individual, the herein disclosed embodiments can be implemented using an interactive display, such as a graphical user interface (GUI). Such GUI's may include interactive features such as pop-up or pull-down menus or lists, selection tabs, scannable features, and other features that can receive human inputs.

The computing system disclosed herein can include clients and servers. A client and server are generally remote from each other and typically interact through a communications network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

We claim:

1. A system for fingerprinting content via a playlist, comprising:
   a data store comprising a non-transitory computer readable medium storing executable computer program instructions;
   a processor that executes the computer program instructions to perform steps comprising:
      receiving an indication that a request for content is to be served;
      generating a code having a plurality of bits associated with the content being served, a number of bits of the code being defined based on a time length of the content;
      generating a playlist to serve a plurality of segments of the content, each of the plurality of segment's time length being determined by a corresponding bit value of the code, wherein each of the plurality of segments has a time length based on the following relationship:
         a bit value of 1 or 0 corresponds to a segment length shorter by a predetermined time gradient,
         a converse bit value of 1 or 0 corresponds to a segment length longer by the predetermined time gradient, and
         a null bit value corresponds to a segment length independent of an alteration by the predetermined time gradient; and
      transmitting the playlist along with the content to a device associated with the request.

2. The system according to claim 1, wherein the code is employed to create a watermark associated with the content.

3. The system according to claim 1, wherein the system stores a lookup table, and the lookup table corresponds to the content, the content's receiver, and the code.

4. The system according to claim 1, wherein the predetermined time gradient introduces noise not detectable by the content's receiver.

5. The system of claim 1, wherein generating the playlist further comprises:
   associating ones of the plurality of bits of the code with ones of the plurality of segments of the content; and
   setting start times of the segments responsive to values of the bits respectively associated with the segments.

6. The system of claim 1, wherein generating the playlist further comprises:
   setting the start time of a segment of the content responsive to a value of a bit of the code associated with the segment, wherein the start time of the segment is set earlier by the predetermined time gradient to represent a first value of the bit and the start time of the segment is set later by the predetermined time gradient to represent a second value of the bit different than the first value.

7. A method implemented on a processor for fingerprinting content via a playlist, comprising:
   receiving an indication that a request for content is to be served;
   generating a code having a plurality of bits associated with the content being served, a number of the bits of the code being defined based on a time length of the content;
   generating a playlist to serve a plurality of segments of the content, each of the plurality of segment's time length being determined by a corresponding bit value of the code, wherein each of the plurality of segments has a time length based on the following relationship:
      a bit value of 1 or 0 corresponds to a segment length shorter by a predetermined time gradient,
      a converse bit value of 1 or 0 corresponds to a segment length longer by the predetermined time gradient, and
      a null bit value corresponds to a segment length independent of an alteration by the predetermined time gradient; and
   transmitting the playlist along with the content to a device associated with the request,
   the receiving, the generating, or the transmitting being performed via the processor.

8. The method according to claim 7, wherein the code is generated based on a random assignment.

9. The method according to claim 7, wherein the code is generated based on an identified aspect of a content consumer to be served the content.

10. The method according to claim 7, wherein the code is employed to create a watermark associated with the content.

11. The system according to claim 7, wherein the system stores a lookup table, and the lookup table corresponds to the content, the content's receiver, and the code.

12. The system according to claim 7, wherein the predetermined time gradient introduces noise not detectable by the content's receiver.

13. The method of claim 7, wherein generating the playlist further comprises:
   associating ones of the plurality of bits of the code with ones of the plurality of segments of the content; and
   setting start times of the segments responsive to values of the bits respectively associated with the segments.

14. The method of claim 7, wherein generating the playlist further comprises:
   setting the start time of a segment of the content responsive to a value of a bit of the code associated with the segment, wherein the start time of the segment is set earlier by the predetermined time gradient to represent a first value of the bit and the start time of the segment is set later by the predetermined time gradient to represent a second value of the bit different than the first value.

15. A method implemented on a processor for determining a source of content, comprising:
  receiving the content as a plurality of segments having an associated playlist;
  determining if the plurality of segments contain a plurality of time gradients by analyzing the playlist;
  re-compiling bit values of a code described by the plurality of time gradients, wherein re-compiling the bit values of the code comprises:
    determining a bit value of 1 or 0 responsive to a segment having a length shorter by a predetermined time gradient,
    determining a converse bit value of 1 or 0 responsive to the segment having a length longer by the predetermined time gradient, and
    determining a null bit value responsive to the segment having a length independent of an alteration by the predetermined time gradient; and
  comparing the recompiled code with a lookup table to ascertain the source,
  the receiving, the determining, the re-compiling, or the comparing being performed via the processor.

16. The method according to claim 15, wherein determining that the plurality of segments contain a plurality of time gradients further comprises analyzing the content for noise associated with the time gradients.

17. The method according to claim 16, wherein the noise is caused by a first segment of the content overlapping a second segment of the content.

18. The method according to claim 17, wherein the noise is caused by a gap in-between the first segment of the content and a second segment of the content.

19. The method according to claim 15, further comprising a watermark associated with the re-compiled code embedded into the content.

* * * * *